June 5, 1956     H. D. MEDFORD     2,749,174
TRAILER HOUSE WITH TELESCOPED ELEVATABLE TOP PORTION
Filed May 27, 1954     2 Sheets-Sheet 1
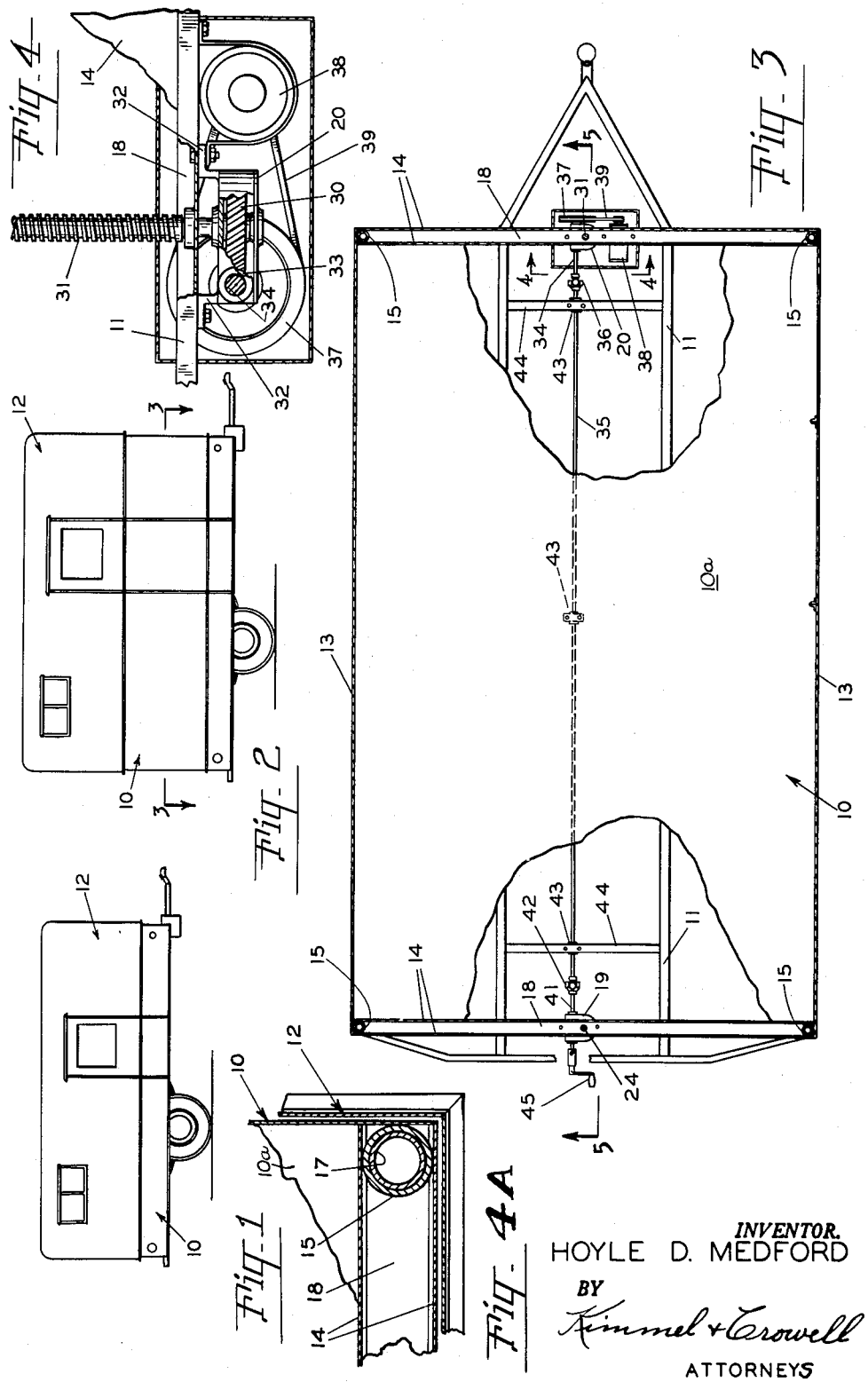
*INVENTOR.*
HOYLE D. MEDFORD
BY
*Kimmel + Crowell*
ATTORNEYS

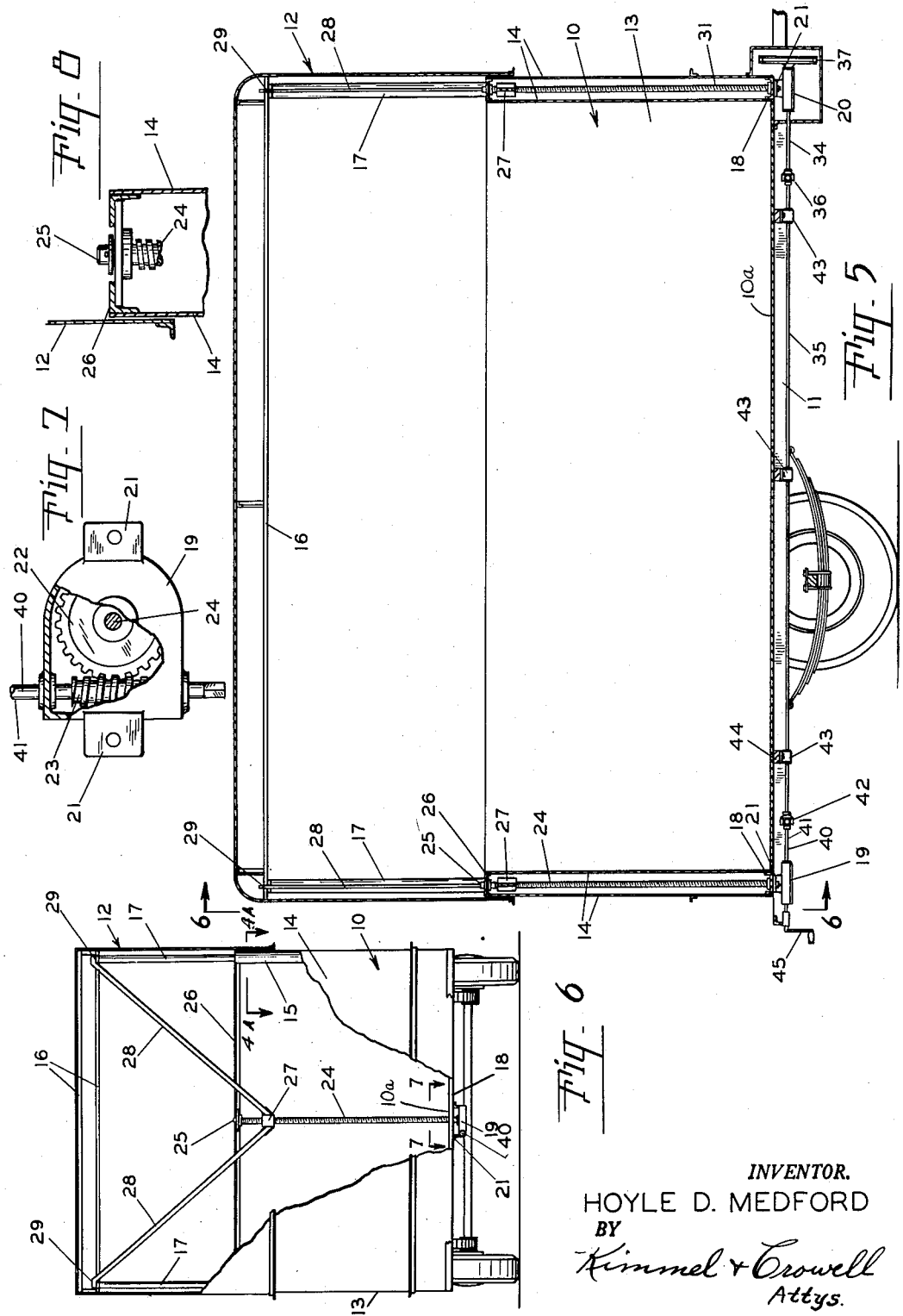

United States Patent Office 2,749,174
Patented June 5, 1956

2,749,174

TRAILER HOUSE WITH TELESCOPED ELEVATABLE TOP PORTION

Hoyle Dillord Medford, Phoenix, Oreg.

Application May 27, 1954, Serial No. 432,861

3 Claims. (Cl. 296—27)

My invention relates to trailer houses and the primary object of the invention is to raise and lower the top portion of the trailer house so that while the trailer is being moved over the highway, the top of the trailer will be down at a low level so that the operator of the vehicle can see over the same at all times.

A further object of the invention is to lower the top of the trailer so that the center of gravity of the house is at a lower level making it easy to maneuver the same over the highways, resulting in a more stable trailer for towing.

Further, air resistance is much reduced, resulting in the saving of fuel.

These and other incidental objects will be apparent in the drawings, specification and claims.

Referring to the drawings:

Figure 1 is a side view of the trailer wherein the top of the same has been lowered.

Figure 2 is a side view of the trailer wherein the top of the trailer has been raised ready to be used as living quarters.

Figure 3 is a plan sectional view, taken on line 3—3 of Figure 2, part of the floor of the trailer being broken away for convenience of illustration.

Figure 4 is an enlarged detail sectional view of the raising and lowering mechanism, taken on line 4—4 of Figure 3, parts broken away for illustration.

Figure 4A is a fragmentary enlarged plan sectional view, taken on line 4A—4A of Figure 6.

Figure 5 is a transverse longitudinal sectional view of the trailer house when the same is in raised position.

Figure 6 is a rear view of the trailer, taken on line 6—6 of Figure 5, parts broken away for convenience of illustration.

Figure 7 is a plan view of the gear box and the raising mechanism, taken on line 7—7 of Figure 6, partially broken away for convenience of illustration.

Figure 8 is a fragmentary detail sectional view, illustrating how the vertical threaded rods are journalled within the body of the trailer.

Referring more specifically to the drawings:

My new and improved trailer house consists of a stationary lower body 10, which is directly mounted to the frame 11 of the trailer, having a movable upper section 12. The upper section of the body can be raised and lowered by a mechanism, which I will now describe.

The lower body 10 consists of a floor 10a, single side walls 13 and double end walls 14 extending upwardly from the floor 10a. Located between the said end walls and within the corner of the body are vertical hollow tubular posts 15. The movable upper section of the trailer house consists of end and side walls mounted to suitable framework 16. Secured to the framework 16 are downwardly extending posts 17. These posts are secured by any suitable means to the framework 16 and are adapted to operate within the hollow tubular posts 15 of the lower body 10, as best illustrated in Figures 3, 5 and 6. The telescopic posts 15 and 17 act as a support for the body section 12, guiding the same vertically in regards to the lower body 10 of the trailer house.

Secured to the lower framework 18 of the trailer house are gear boxes 19 and 20. These gear boxes have feet or brackets 21, which are bolted to the frame 11 of the trailer. The gear box 19 has a worm wheel 22 journalled therein driven by the worm 23, which is also journalled within the gear box 19 in the usual manner. Extending vertically of the worm gear 22 is a threaded shaft 24, having its upper end 25 journalled within the cross frame member 26. The cross frame member 26 forms part of the lower body 10 of the trailer, and is best illustrated in Figures 5 and 6.

A threaded member 27 is mounted to the threaded shaft 24 and secured to this threaded member 27 are braces 28 having their upper ends fixedly secured at 29 to the framework 16 of the upper section 12 of the trailer house. These braces 28 guide the upper section 12, as well as raise or lower the same in combination with the guide posts 17. The walls of the upper section 12 also assist in guiding the said upper house up and down on the lower section 10.

The gear box 20 has a worm wheel 30 journalled therein and has a vertical threaded shaft 31 extending upwardly therefrom. The gear box 20 is connected to the framework 18 of the trailer house by the brackets 32. It also has a worm 33 for rotating the same, the worm wheel 30 and vertical threaded shaft 31. Extending from the worm 33 through the gear box is a shaft 34, which is connected to a shaft 35 running longitudinally of the trailer house.

The shafts 34 and 35 are connected together by a universal connection 36. Mounted to the opposite end of the shaft 34 is a V-belt pulley 37. The pulley 37 is driven from the electric motor 38 by means of the belt 39. The motor 38 is controlled by a reversing switch (not shown).

Referring to Figure 7, the worm 23 is keyed to the shaft 40 which is journalled within the gear box 19 in the usual manner. The end 41 of the shaft 40 is connected to the drive shaft 35 by means of the universal connection 42. The shaft 35 is journalled within bearings 43 mounted to the framework 44 of the trailer. The opposite end of the shaft 40 extends beyond the gear box 19 to receive the crank 45 so that the upper housing 12 can be raised and lowered by hand if necessary.

The device is converted from living quarters to trailing position, or vice versa as follows. The electric motor 38 is started in the proper direction to move the upper section 12 of the trailer house in the desired direction, either up or down. This revolves the shaft 34 by means of the belt 39 and pulley 37. This will rotate the shaft 35 and the shaft 40 of the gear box 19 rotating the worm wheels 22 and 30 in a direction to rotate the threaded shafts 24 and 31 within the threaded members 27, raising and lowering the V-bracing or bridle 28, together with the posts 17 within the hollow posts 15, together with the whole body section 12, up or down depending upon the direction of rotation of the motor 38.

In the event it is necessary to operate the same by hand, a crank 45 is applied to the end of the shaft 40, as best illustrated in Figure 3. This will rotate the worm wheels 22 and 30 and threaded shafts 24 and 31 to raise and lower the upper section 12 of the trailer house, the rotor of the electric motor 38 would be rotated freely by this action. The worm wheels act as a locking mechanism for holding the section 12 in its raised position.

From the above description it can be readily understood what a simple matter it is to convert the trailer house from living quarters to a trailer that can be pulled over the highway with ease, giving clearer vision over the same at all times and offering greater stability in its operation, reducing wind resistance and cutting down operating costs.

What is claimed is:

1. An extensible trailer body comprising a frame, a floor secured to said frame, opposed side walls secured to said floor, a pair of spaced parallel end walls connecting said side walls at the front end thereof and a second pair of spaced parallel end walls connecting said side walls at the rear end thereof, said floor, said side walls and said spaced parallel end walls forming an open top lower body, an upright tubular guide carried by each corner of said lower body between said parallel walls of said front and said rear end walls, an upper framework, depending posts secured to each corner of said upper framework, said posts telescopically engaging in said respective tubular guides, means for moving said upper framework including a pair of vertically movable elements disposed at opposite ends of said lower body, a V-shaped support secured at its upper divergent ends to one end of said upper framework and at its lower end to one of said movable elements, a second V-shaped support secured to said framework and said movable element at the end opposite said first V-shaped support and an upper body member suspended from said framework and telescoping over said lower body.

2. A device as claimed in claim 1 wherein said vertically movable elements are enclosed between said parallel end walls of said front and said rear walls.

3. A device as claimed in claim 1 wherein said means for moving said upper framework is mounted beneath said trailer frame and extends vertically between said parallel end walls of said front and said rear walls.

References Cited in the file of this patent

UNITED STATES PATENTS

| | | |
|---|---|---|
| 2,193,352 | Thomas | Mar. 12, 1940 |
| 2,225,319 | Rollo | Dec. 17, 1940 |
| 2,292,107 | Doepke | Aug. 4, 1942 |
| 2,561,921 | Guillot | July 24, 1951 |